United States Patent
Naruse

(10) Patent No.: US 7,054,526 B2
(45) Date of Patent: May 30, 2006

(54) OPTICAL MULTIPLEXER/DEMULTIPLEXER

(75) Inventor: Terukazu Naruse, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/094,346

(22) Filed: Mar. 31, 2005

(65) Prior Publication Data

US 2005/0254753 A1 Nov. 17, 2005

Related U.S. Application Data

(63) Continuation of application No. PCT/JP02/12309, filed on Nov. 26, 2002.

(51) Int. Cl.
*G02B 6/34* (2006.01)
*H04J 14/02* (2006.01)

(52) U.S. Cl. .......................... 385/37; 385/14; 385/129; 385/130; 398/79; 398/82; 398/84; 398/87

(58) Field of Classification Search .................. 385/14, 385/24, 37, 129, 130, 131, 132; 398/79, 398/80, 81, 82, 83, 84, 85, 87
See application file for complete search history.

(56) References Cited

U.S. PATENT DOCUMENTS

| | | | |
|---|---|---|---|
| 4,923,271 A | 5/1990 | Henry et al. .............. 385/37 X |
| 5,581,405 A | 12/1996 | Meyers et al. .......... 359/569 X |
| 5,589,983 A | 12/1996 | Meyers et al. .............. 359/565 |
| 5,638,212 A | 6/1997 | Meyers et al. .............. 359/565 |
| 5,917,625 A | 6/1999 | Ogusu et al. ................ 359/130 |
| 2002/0081061 A1* | 6/2002 | He et al. ........................ 385/24 |
| 2002/0081062 A1* | 6/2002 | He .............................. 385/24 |
| 2005/0063636 A1* | 3/2005 | Joyner .......................... 385/14 |

FOREIGN PATENT DOCUMENTS

| | | |
|---|---|---|
| JP | 55-029824 | 3/1980 |
| JP | 3033805 | 2/1991 |
| JP | 06-003709 | 1/1994 |
| JP | 08-005861 | 1/1996 |
| JP | 10-319256 | 12/1998 |
| WO | WO 98/00751 | 1/1998 |

* cited by examiner

*Primary Examiner*—Brian M. Healy
(74) *Attorney, Agent, or Firm*—Staas & Halsey LLP

(57) ABSTRACT

An optical multiplexer/demultiplexer uses a diffraction grating, capable of multiplexing/demultiplexing lights of narrow wavelength spacing at a short focal distance. To this end, a plurality of output waveguide groups is connected to one end face of a slab waveguide to which an input waveguide group is connected. A diffraction grating in which grating grooves, each including a plurality of reflection planes blazed corresponding to respective arrangement directions of the plurality of output waveguide groups are formed, is disposed on the other end face of the slab waveguide. The arrangements of the respective output waveguide groups are determined, so that diffracted lights of wavelengths different from each other, which are reflected by the reflection planes of the diffraction grating, respectively reach the output waveguides of the plurality of output waveguide groups.

12 Claims, 5 Drawing Sheets

(A)

(B)
Y ENLARGED DIAGRAM (A)

(B)

X ENLARGED DIAGRAM (A)

(B)

Y ENLARGED DIAGRAM

EXAMPLE OF CONVENTIONAL OPTICAL MULTIPLEXER/DEMULTIPLEXER

BALAZING OF TYPICAL DIFFRACTION GRATING

OPTICAL MULTIPLEXER/DEMULTIPLEXER

This application is a continuation of PCT/JP02/12309, filed on Nov. 26, 2002 pending.

BACKGROUND OF THE INVENTION

1. Field of the Invention

The present invention relates to an optical multiplexer/demultiplexer for multiplexing/demultiplexing lights of different wavelengths, and in particular, to an optical multiplexer/demultiplexer using a diffraction grating.

2. Description of the Related Art

As a conventional optical multiplexer/demultiplexer, there has been known a configuration using a prism or a diffraction grating as disclosed in Japanese Unexamined Patent Publication No. 55-29824 or Japanese Unexamined Patent Publication No. 8-5861. Further, there has been known a configuration using a multi-reflection layer as disclosed in Japanese Unexamined Patent Publication No. 10-319256.

FIG. 6 is a top plan view showing a waveguide configuration using a concave diffraction grating as one example of conventional optical multiplexer/demultiplexer using a diffraction grating. To be specific, the optical multiplexer/demultiplexer in FIG. 6 comprises: a slab waveguide 101; a single input waveguide 102 connected to the slab waveguide 101; an output waveguide group 103 consisting of one or more output waveguides connected to the slab waveguide 101 on the same side of the input waveguide 102; and a reflection concave diffraction grating 104 disposed to the slab waveguide 101 on the opposite side of the input waveguide 102. In this optical multiplexer/demultiplexer, if the total length in a lengthwise direction of the slab waveguide 101 is f, a shape of one end face of the slab waveguide 101 is an arc of diameter f passing through a center point $P_0$ of the slab waveguide 101, and the input waveguide 102 and the output waveguide group 103 are connected onto the arc. Further, a shape of the other end face of the slab waveguide 101 is an arc of radius f, whose center is a point $P_1$ on the one end face positioned between the input waveguide 102 and the output waveguide group 103, and the concave diffraction grating 104 is formed on this arc.

In the conventional optical multiplexer/demultiplexer having the above configuration, lights incident from the input waveguide 102 are freely propagated through the slab waveguide 101 to be reflected by the concave diffraction grating 104. At this time, the lights reflected by respective grooves of the concave diffraction grating 104 interfere with each other, to be diffracted to a direction where an optical path length difference between adjacent lights becomes an integral multiple of the wavelength (to be referred to the diffraction order). Generally, provided that an angle (incident angle) of a propagation direction of an incident light to a normal on a grating plane of the diffraction grating is $\alpha$, and an angle (diffraction angle) of a propagation direction of a diffracted light to the normal marked on the grating plane of the diffraction grating is $\theta$, a relationship shown in the following equation (1) is established between the incident angle $\alpha$ and the diffraction angle $\theta$.

$$\sin\theta - \sin\alpha = \frac{m \cdot \lambda}{n_s \cdot d} \quad (1)$$

Note, m is the diffraction order, $\lambda$ is a center wavelength of the incident light, $n_s$ is the effective refractive index of the slab waveguide, and d is a grating interval of the diffraction grating.

Normally, for the intensity of lights reflected by the diffraction grating, as shown in (A) of FIG. 7, a reflected light $L_R$ of a light $L_1$ incident on the diffraction grating has the highest intensity. Therefore, as shown in (B) of FIG. 7, the inclination of the reflection plane (groove plane) of the diffraction grating to the incident light $L_1$ is designed so that a propagation direction of a reflected light $L_R$ becomes equal to a propagation direction of a diffracted light $L_P$ of required order m, and the diffraction grating is blazed so that the energy of the incident light $L_1$ to a specific wavelength is effectively converted into the diffracted light $L_P$. In such a blazed diffraction grating, an angle $\epsilon$ between a normal of the grating plane and a normal of the reflection plane becomes a blaze angle, and a wavelength diffracted to a direction equal to the normal of the reflection plane becomes a blaze wavelength. The blazing of the diffraction grating as described above has been conventionally performed only for the diffracted light of a single direction (order).

Generally, the optical multiplexer/demultiplexer using a diffraction grating has a drawback in that, if the wavelength spacing of lights to be demultiplexed (or multiplexed) is narrowed, since a focal distance of a diffracted light is lengthened, the size of the optical multiplexer/demultiplexer is enlarged. To be specific, a focal distance f of the optical multiplexer/demultiplexer using the concave diffraction grating 104 as shown in FIG. 6 can be simply calculated in accordance with the next equation (2).

$$\Delta\lambda = \frac{d \cdot \Delta x \cdot n_n \cdot \cos\theta}{m \cdot f} \quad (2)$$

Note, $\Delta x$ is an interval of the output waveguides, $\Delta\lambda$ is the wavelength spacing of the lights to be demultiplexed (or multiplexed).

The consideration will be made on, for example, an optical multiplexer/demultiplexer having the wavelength spacing $\Delta\lambda_1$ and an optical multiplexer/demultiplexer having the wavelength spacing $\Delta\lambda_2$ which is half the wavelength spacing $\Delta\lambda_1$ (=$\Delta\lambda_1/2$). Here, a focal distance for when the wavelength spacing is $\Delta\lambda_1$ is $f_1$, and a focal distance for when the wavelength spacing is $\Delta\lambda_2$ is $f_2$. In this case, if the same diffraction order m, grating interval d and output waveguide interval $\Delta x$ are used in each optical multiplexer/demultiplexer, the focal distance $f_2$ becomes twice the focal distance $f_1$ according to the equation (2). In order to reduce the focal distance $f_2$, it is necessary to reduce either a value of the grating interval d or a value of the output waveguide interval $\Delta x$, or to increase the diffraction order m.

However, if the output waveguide interval $\Delta x$ is narrowed, the optical coupling between adjacent output waveguides is strengthened, resulting in the degradation of adjacent crosstalk. On the other hand, if the diffraction order m is increased, since a FSR (free spectrum region) of the optical multiplexer/demultiplexer is narrowed, there is a problem in that an optical intensity difference between output channels is increased.

Further, in the case where the grating interval d is narrowed or the diffraction order m is increased, it is apparent from the relationship in the equation (1) that the diffraction angle $\theta$ is enlarged. Since the diffraction angle $\theta$ cannot be made to be 90° or more, there is a certain limit to the optimization of the grating interval d or the diffraction order m to reduce the focal distance $f_2$.

The present invention has been accomplished in view of the above problems and has an object to provide an optical multiplexer/demultiplexer of small size, capable of multiplexing/demultiplexing lights of narrow wavelength spacing at a short focal distance.

SUMMARY OF THE INVENTION

In order to achieve the above object, according to the present invention, there is provided an optical multiplexer/demultiplexer for multiplexing or demultiplexing lights of different wavelengths using a diffraction grating, comprising: a slab waveguide through which the lights are freely propagated along a waveguide plane of layer shape; an input waveguide group consisting of one or more input waveguides connected to an end face of the slab waveguide; a plurality of output waveguide groups each consisting of one or more output waveguides, which is positioned on the same side of the input waveguide group to be connected to the end face of the slab waveguide; and a diffraction grating in which a grating plane is arranged on an end face of the slab waveguide positioned on an opposite side of the input waveguide group, and grating grooves each including a plurality of reflection planes respectively blazed corresponding to arrangement directions of the plurality of output waveguide groups, are consecutively formed on the grating plane. Further, in the above optical multiplexer/demultiplexer, the respective output waveguide groups are arranged so that diffracted lights of wavelengths different from each other, which are appeared as a result that the lights incident from the input waveguide group are propagated through the slab waveguide to be reflected by the respective reflection planes of the diffraction grating, respectively reach the output waveguides of the plurality of output waveguide groups.

In the optical multiplexer/demultiplexer of the above configuration, the plurality of output waveguide groups is arranged for the single input waveguide group, and the lights incident from the input waveguide group are propagated through the slab waveguide to be respectively reflected by the plurality of reflection planes of the diffraction grating, so that the diffracted lights separately traveling to different directions according to the respective reflection planes are appeared. At this time, since the reflection planes of the diffraction grating are blazed respectively corresponding to the arrangement directions of the respective output waveguide groups, the diffracted lights are propagated through the slab waveguide toward the pertinent output waveguide groups, resulting in that the lights of wavelengths different from each other are extracted from the respective output waveguides of the respective output waveguide groups. Further, contrary to the optical demultiplexing described above, the lights of respective wavelengths given from the respective output waveguide groups are multiplexed using the diffraction grating to be extracted from the input waveguide group. As a result, it becomes possible to narrow the wavelength spacing of the lights to be demultiplexed or multiplexed while suppressing an increase of a focal distance of the optical multiplexer/demultiplexer.

As one aspect of the above optical multiplexer/demultiplexer, the plurality of output waveguide groups may be arranged to the end face of the slab waveguide on both sides of the input waveguide group. In this case, the grating grooves each including the plurality of reflection planes symmetric to each other with respect to an arrangement direction of the input waveguide group may be consecutively formed on the grating plane of the diffraction grating.

Further, as another aspect of the above optical multiplexer/demultiplexer, the plurality of output waveguide groups may be arranged to the end face of the slab waveguide on one side of the input waveguide group. At this time, it is desirable that an angle of the arrangement direction of each of the plurality of output waveguide groups to a normal of the grating plane of the diffraction grating becomes smaller than an incident angle of each of the lights incident from the input waveguide group. In such an aspect, since the diffraction order of the lights extracted from the respective output waveguides becomes larger, it becomes possible to reduce the focal distance to minimize the optical multiplexer/demultiplexer.

Moreover, the optical multiplexer/demultiplexer described above may be provided with an optical amplifier amplifying the lights propagated through the input waveguide group. According to this configuration, an increase of loss due to the diffraction in plural times of the incident lights in the diffraction grating is compensated by the optical amplifier.

In addition, as a specific configuration of the above optical multiplexer/demultiplexer, an area ratio between the plurality of reflection planes of the diffraction grating may be set so that the powers of the diffracted lights respectively reaching the plurality of output waveguide groups become substantially equal to each other. As a result, it becomes possible to perform the optical multiplexing/demultiplexing stably on the respective wavelengths.

Other objects, features and advantages of the present invention will become apparent from the following explanation of the embodiments, in conjunction with the appended drawings.

DESCRIPTION OF THE PREFERRED EMBODIMENTS

Figure 1:
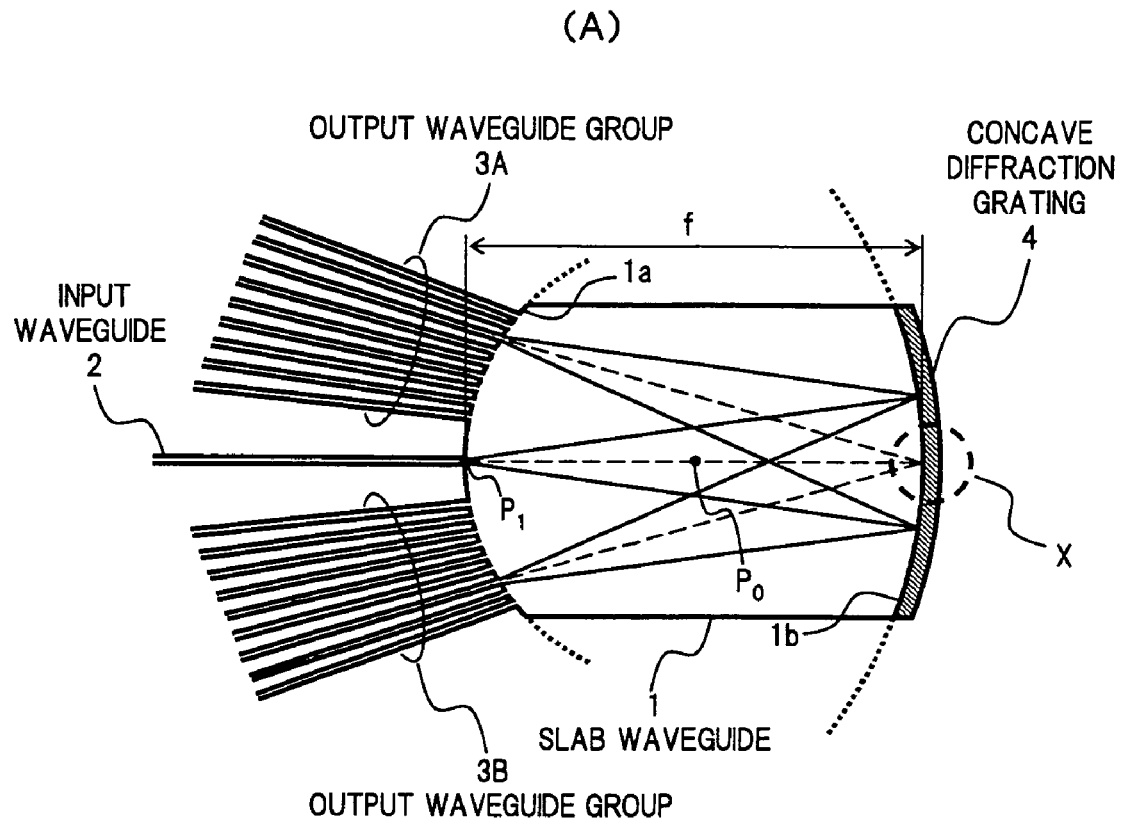
FIG. 1 is a top plan view showing a configuration of an optical multiplexer/demultiplexer according to a first embodiment of the present invention.
Figure 1:
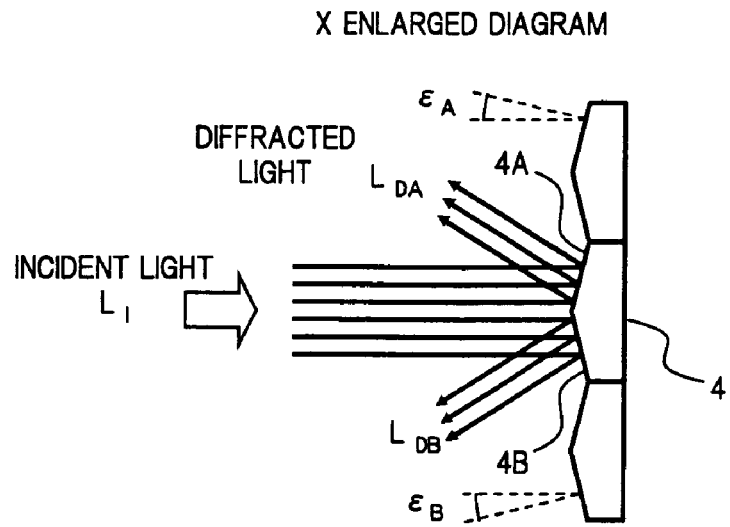

There will be described embodiments of an optical multiplexer/demultiplexer according to the present invention, with reference to the accompanying drawings. The same reference numerals denote the same or equivalent parts in all drawings.

FIG. 1 is a top plan view showing an optical multiplexer/demultiplexer according to a first embodiment of the present invention, in which (A) is a configuration diagram of a main part and (B) is an enlarged diagram of X portion encircled by a broken line in (A).

In FIG. 1, the present optical multiplexer/demultiplexer comprises, for example: a slab waveguide 1; an input waveguide 2 connected to an end face 1a of the slab waveguide 1; a plurality (here, two) of output waveguide groups 3A and 3B, which is positioned on the same side of the input waveguide 2 to be connected to the end face 1a of the slab waveguide 1; and a concave diffraction grating 4 which is positioned on the opposite side of the input waveguide 2 to be disposed to an end face 1b of the slab waveguide 1, and includes two reflection planes 4A and 4B blazed corresponding to respective arrangement directions of the output waveguide groups 3A and 3B.

The respective constitutional elements of the optical multiplexer/demultiplexer are formed on a silicon substrate for example. The slab waveguide 1 is a waveguide of layer shape, through which lights are freely propagated to directions along a plane thereof. The end face 1a in a lengthwise direction of the slab waveguide 1 is positioned on an arc of diameter f passing through a center point $P_0$, and the other end face 1b thereof is positioned on an arc of radius f whose center is a point $P_1$ on the opposite end face 1a. The length f corresponds to a focal distance of the present multiplexer/demultiplexer.

The input waveguide 2 is connected onto the end face 1a of the slab waveguide 1 at one end thereof, and leads incident lights given from the other end thereof to the slab waveguide 1. Here, the input waveguide 2 is connected to the point $P_1$ positioned approximately on the center of the end face 1a of the slab waveguide 1. Note, herein, the case where the single input waveguide 2 is connected to the slab waveguide 1 has been shown. However, the present invention is not limited to this, an input waveguide group consisting of a plurality of input waveguides arranged at a required interval in the same manner as the output waveguide groups 3A and 3B to be described later, may be connected to the slab waveguide 1.

The output waveguide groups 3A and 3B each comprises a plurality of output waveguides which is connected onto the end face 1a of the slab waveguide 1 at one end thereof. The output waveguide group 3A is arranged on one side (upper part in (A) of FIG. 1) of the input waveguide 2, while the output waveguide group 3B is arranged on the other side (lower part in (A) of FIG. 1) of the input waveguide 2. The plurality of output waveguides configuring the respective output waveguide groups 3A and 3B is connected to the end face 1a of the slab waveguide 1 at the one end thereof in accordance with a waveguide interval set based on the wavelength spacing of the lights to be multiplexed/demultiplexed. Specific arrangements of the respective output waveguides on the end face 1a of the slab waveguide 1 will be described later.

The concave diffraction grating 4 is configured so that a grating plane thereof is arranged along the other end face 1b of the slab waveguide 1. As shown in a X enlarged diagram in (B) of FIG. 1, on the grating plane of the concave diffraction grating 4, there are consecutively formed along the end face 1b of the slab waveguide 1, grating grooves each including the reflection plane 4A blazed corresponding to the arrangement direction of the output waveguide group 3A and the reflection plane 4B which is in a positional relationship symmetric to the reflection plane 4A (in the figure, vertical symmetry) and is blazed corresponding to the arrangement direction of the output waveguide group 3B. Here, blaze angles (angle between a normal of the grating plane and a normal of the reflection plane) of the reflection planes 4A and 4B are represented by $\epsilon_A$ and $\epsilon_B$. In the present embodiment, since the reflection planes 4A and 4B are in a symmetric positional relationship, $\epsilon_A = \epsilon_B$. Note, the arrangement direction of the output waveguide group is a direction where one end of the center positioned optical waveguide among the plurality of output waveguides exists. Further, it is desirable that an area ratio between the reflection planes 4A and 4B is 1:1, and the powers of diffracted lights reflected by the reflection planes 4A and 4B becomes substantially equal to each other.

Next, there will be described an operation of the optical multiplexer/demultiplexer in the first embodiment.

In the optical multiplexer/demultiplexer of the above configuration, when an incident light $L_1$ passes through the input waveguide 2 to reach the end face 1a of the slab waveguide 1, the incident light $L_1$ is freely propagated through the slab waveguide 1 toward the end face 1b on the opposite side, and then, the incident light $L_1$ reached the end face 1b is reflected by the concave diffraction grating 4. At this time, as shown by arrows in (B) of FIG. 1, the incident light $L_1$ is reflected by the two reflection planes 4A and 4B of the concave diffraction grating 4. Therefore, the light (diffracted light) reflected by the concave diffraction grating 4 is divided into two directions, to be propagated through the slab waveguide 1. Here, the diffracted light reflected by the reflection plane 4A is $L_{DA}$ and the diffracted light reflected by the reflection plane 4B is $L_{DB}$.

Figure 2:
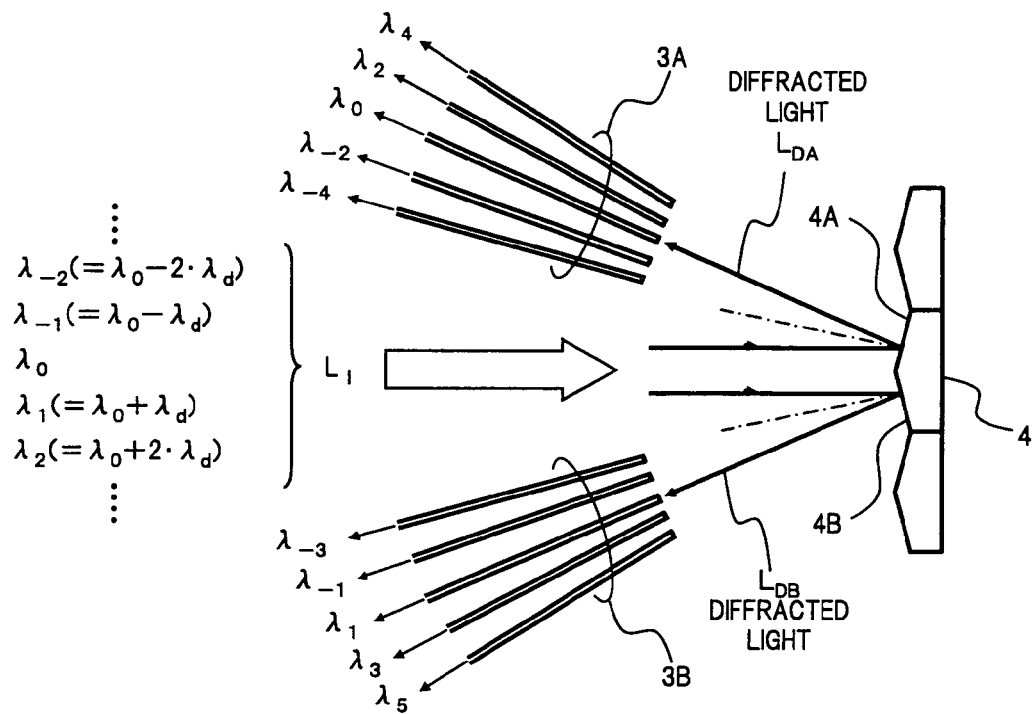
FIG. 2 is a pattern diagram for explaining an operation of the first embodiment.

For example, as shown in a pattern diagram of FIG. 2, the consideration is made on the case where the incident light $L_1$ containing lights having a plurality of wavelengths equally allocated at the wavelength spacing $\lambda_d$ with the wavelength $\lambda_0$ as the center, is reflected by the concave diffraction grating 4. Note, herein, the wavelengths of the lights contained in the incident light $L_1$ are . . . $\lambda_{-2}$ ($=\lambda_0-2\cdot\lambda_d$), $\lambda_{-1}$ ($=\lambda_0-\lambda_d$), $\lambda_0$, $\lambda_{-1}$ ($=\lambda_0+\lambda_d$), $\lambda_{-2}$ ($=\lambda_0+2\cdot\lambda_d$), . . . . In this case, the output waveguides of the output waveguide group 3A are respectively arranged at the waveguide interval $\Delta x$ corresponding to twice the wavelength spacing $\lambda_d$ of the incident light $L_1$, in a propagation direction of the diffracted light $L_{DA}$, and further, the output waveguides of the output waveguide group 3B are respectively arranged at the waveguide interval $\Delta x$ corresponding to the above doubled wavelength spacing ($2\cdot\lambda_d$), in a propagation direction of the diffracted light $L_{DB}$, so that the lights obtained by demultiplexing the incident light $L_1$ according to the wavelengths are extracted from the respective output waveguides.

At this time, the arrangement of the output waveguides of the output waveguide group 3A is determined so that the light of center wavelength $\lambda_0$ is extracted by the output waveguide positioned on the center of the output waveguide group 3A. As a result, the respective lights of wavelengths $\lambda_0, \lambda_{\pm 2}, \lambda_{\pm 4}, \ldots$ are extracted from the output waveguide group 3A. On the other hand, the arrangement of the output waveguides of the output waveguide group 3B is determined so that the light of center wavelength $\lambda_1$ is extracted by the output waveguide positioned on the center of the output waveguide group 3B. As a result, the respective lights of wavelengths $\lambda_{\pm 1}, \lambda_{\pm 3}, \lambda_{\pm 5}, \ldots$ are extracted from the output waveguide group 3B. Thus, by shifting the relative arrangements of the output waveguide groups 3A and 3B for the input waveguide 2 to the concave diffraction grating 4 in which the vertically symmetric reflection planes 4A and 4B are formed (a shift amount of relative position is $\Delta x/2$), even if the output waveguides are arranged at the waveguide interval $\Delta x$ corresponding to twice the wavelength spacing $\lambda_d$ of the incident light $L_1$, it becomes possible to demultiplex the incident light $L_1$ at the wavelength spacing $\lambda_d$.

Here, as a specific example of the optical multiplexer/demultiplexer as described above, there is cited a configuration for the case where the multiplexing/demultiplexing is performed on lights arranged at the wavelength spacing 0.4 nm in a wavelength band whose center is 1550 nm.

In the configuration of the specific example, a material of the optical waveguide is a silica glass, the thickness of an under cladding layer is 20 μm, and the thickness of an over cladding layer is 20 μm. In each of the input and output waveguides, a cross section of a core is 5.4×5.4 μm, and a relative index difference is 0.80%. Further, the focal distance f determining the total length of the slab waveguide 1 is 73.1 mm, and the interval Δx between the output waveguides is 20 μm. In the concave diffraction grating 4, a grating interval d is 12 μm, the blaze angles $\epsilon_A$ and $\epsilon_B$ are both 16°, and the blaze wavelength is 1550 nm. In the arrangements of the output waveguide groups 3A and 3B, the output waveguide positioned on the center of the output waveguide group 3A is arranged in a direction of diffraction angle of 32°, while the output waveguide positioned on the center of the output waveguide group 3B is arranged on a position shifted by 10 μm to a direction of diffraction angle of −32° on the end face 1a of the slab waveguide 1.

According to such a specific configuration, the lights of wavelength spacing 0.8 nm, whose center is 1550 nm, are extracted from the output waveguide group 3A, and the lights of wavelength spacing 0.8 nm, whose center is 1550.4 nm, are extracted from the output waveguide groups 3B. As a result, the optical multiplexer/demultiplexer which multiplexes or demultiplexes the lights in 1550 nm band at the wavelength spacing 0.4 nm, can be realized.

As described above, according to the optical multiplexer/demultiplexer in the first embodiment, the output waveguide groups 3A and 3B are separately arranged on both sides of the input waveguide 2, and the concave diffraction grating 4 including the reflection planes 4A and 4B blazed respectively corresponding to the arrangement directions of the output waveguide groups 3A and 3B, is used, so that the optical multiplexing/demultiplexing of the lights of the wavelength spacing $\lambda_d$ can be performed while maintaining the focal distance same as that of the optical multiplexer/demultiplexer corresponding to the wavelength spacing 2·$\lambda_d$. Thus, it becomes possible to realize an optical multiplexer/demultiplexer of small size in which the wavelength spacing of lights to be multiplexed/demultiplexed is reduced while an increase of the focal distance being suppressed.

Next, there will be described a second embodiment of the present invention.

Figure 3:
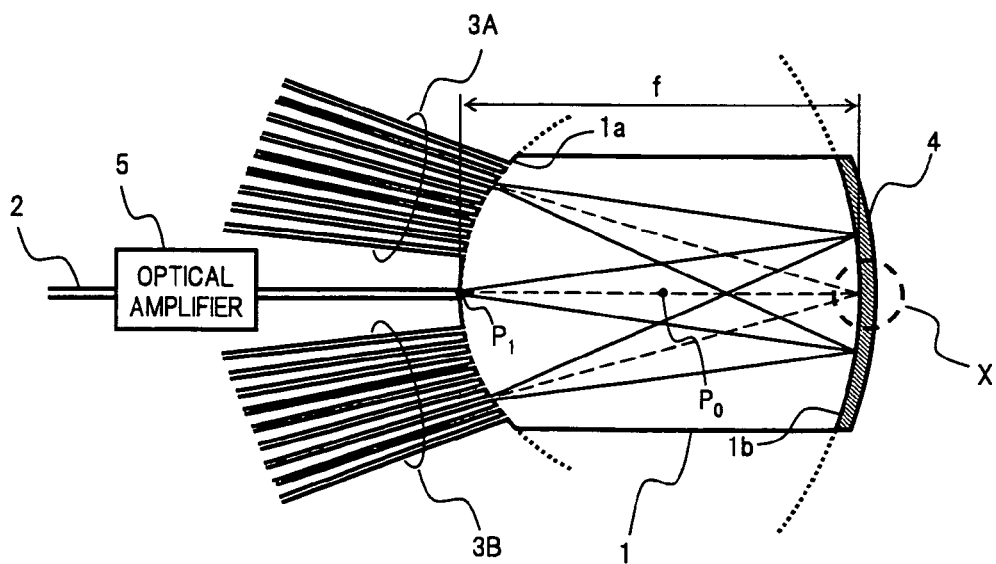
FIG. 3 is a top plan view showing a configuration of an optical multiplexer/demultiplexer according to a second embodiment of the present invention.

FIG. 3 is a top plan view showing a configuration of an optical multiplexer/demultiplexer according to the second embodiment.

In FIG. 3, the configuration of the present optical multiplexer/demultiplexer differs from that in the above first embodiment, in that an optical amplifier 5 is connected to the halfway of the input waveguide 2. The configuration other than the above is same as that in the first embodiment, and accordingly, the description thereof is omitted here.

The optical amplifier 5 is a typical optical amplifier for amplifying the power of the incident light $L_1$ being propagated through the input waveguide 2 up to the required level. It is desirable to use a semiconductor optical amplifier (SOA) as the optical amplifier 5, from a viewpoint of miniaturization of the optical multiplexer/demultiplexer or the like. However, the optical amplifier applicable to the present invention is not limited to the semiconductor optical amplifier.

Figure 6:
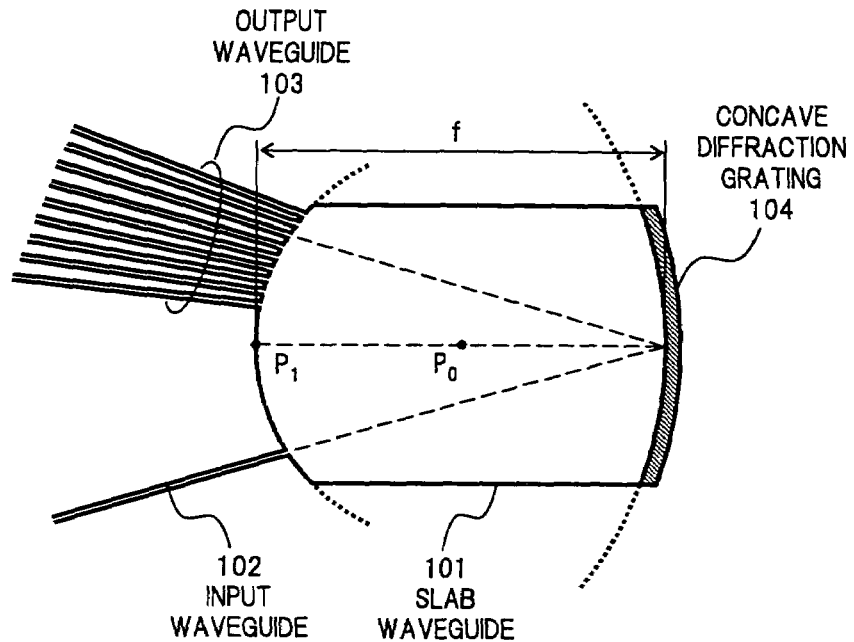
FIG. 6 is a top plan view showing one example of conventional optical multiplexer/demultiplexer.
Figure 7:
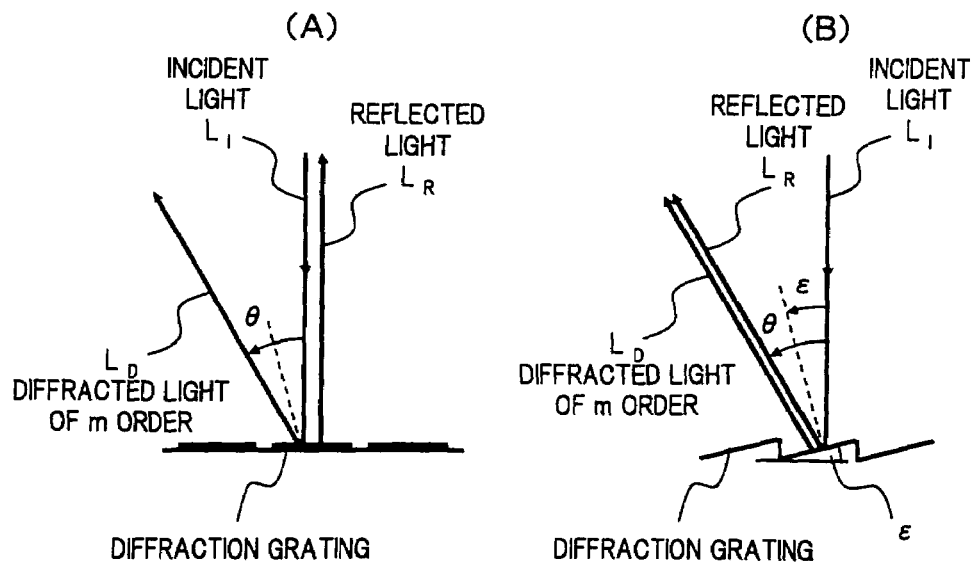
FIG. 7 is a schematic diagram for explaining the blazing of a typical diffraction grating.

In the optical multiplexer/demultiplexer of the above configuration, an increase of loss being one of drawbacks in the above first embodiment is avoided. Namely, in the configuration of the first embodiment, since the incident light $L_1$ is divided into two by the concave diffraction grating 4, comparing with a convention configuration shown in FIG. 6, the power of the light extracted from each of the output waveguides is reduced. In order to avoid the increase of loss in such an optical multiplexer/demultiplexer, in the present embodiment, the optical amplifier is connected to the input side of the optical multiplexer/demultiplexer, and the incident light $L_1$ is previously amplified up to the required level. Thus, it becomes possible to compensate for the loss occurred due to the division of the light into two by the concave diffraction grating 4.

Next, there will be described a third embodiment of the present invention.

Figure 4:
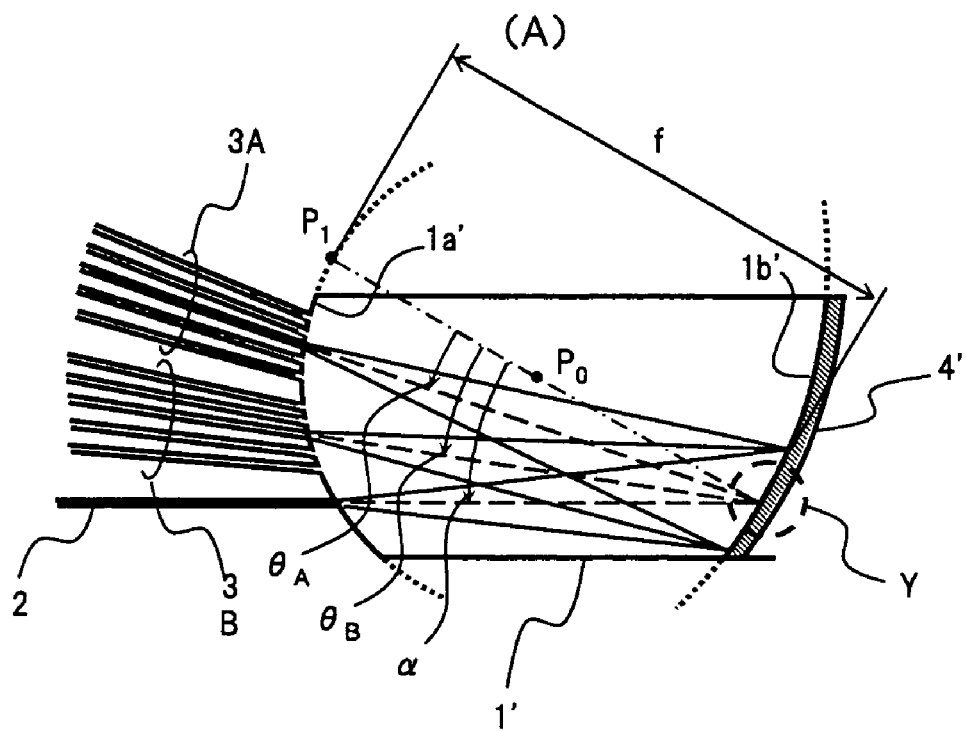
FIG. 4 is a top plan view showing a configuration of an optical multiplexer/demultiplexer according to a third embodiment of the present invention.
Figure 4:
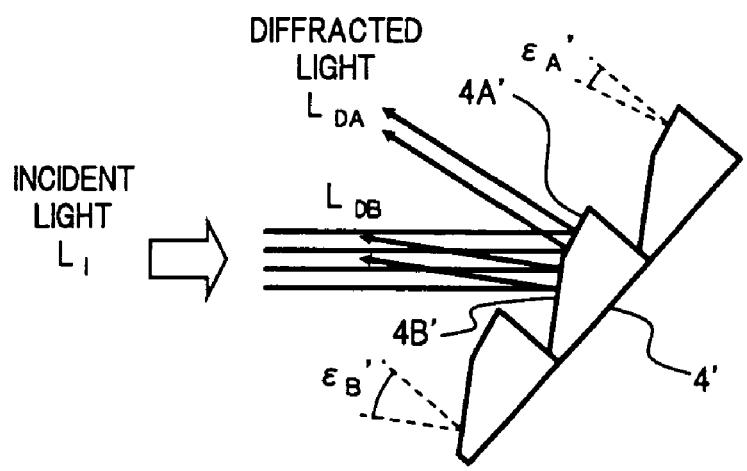

FIG. 4 is a top plan view showing a configuration of an optical multiplexer/demultiplexer according to the third embodiment, in which (A) is a configuration diagram of a main part, and (B) is an enlarged diagram of Y portion encircled by a broken line in (A).

The configuration of the optical multiplexer/demultiplexer shown in FIG. 4 is an application example for further increasing the diffraction order m of the lights extracted from the respective output waveguides to reduce the focal distance f, in the optical multiplexer/demultiplexer in the first embodiment, to thereby achieve the further miniaturization of the optical multiplexer/demultiplexer. To be specific, in order to increase the diffraction order m in the optical multiplexer/demultiplexer, it is necessary to set an incident angle α of the light to the concave diffraction grating 4 to be larger. However, in the case where the incident angle α is set to be larger, since it is difficult to arrange the output waveguide group on the side where an angle thereof is larger than the incident angle α, it is necessary to arrange the output waveguide group on the side where an angle thereof is smaller than the incident angle α.

Therefore, in the optical multiplexer/demultiplexer according to the present embodiment, the modification of the shapes of the end faces 1a and 1b of the slab waveguide 1 used in the first embodiment is performed, to form a slab waveguide 1', and also, the two output waveguide groups 3A and 3B are arranged respectively on one side (upper part in (A) of FIG. 4) of the input waveguide 2 connected to an end face 1a' of the slab waveguide 1' and a concave diffraction grating 4' blazed corresponding to the arrangement directions of the output waveguide groups 3A and 3B is disposed along an end face 1b' of the slab waveguide 1', so that the larger incident angle α is realized.

To be specific, the shape of the slab waveguide 1' is similar to the shape of the slab waveguide 1 used in the first embodiment, in that the one end face 1a' is positioned on the arc of diameter f passing through the center point $P_0$ and the other end face 1b' is positioned on the arc of radius f whose center is the point $P_1$. A difference between the shapes is in that the point $P_1$ is positioned on an extension of the end face 1a'. In the first embodiment, the input waveguide 2 is connected to the position of the point $P_1$. However, in the present embodiment, the input waveguide 2 is connected onto the end face 1a' whose position is different from the point $P_1$, and the shape of arc (cutting site) of each of the end faces 1a' and 1b' is designed according to the connection position of the input waveguide 2.

Each of the output waveguide groups 3A and 3B is arranged in a direction in which the angle thereof to a normal of a grating plane of the concave diffraction grating 4' becomes smaller than the incident angle α. To be specific, as shown in (A) of FIG. 4, provided that the angle (diffraction angle) of the arrangement direction of the output waveguide group 3A to the normal of the grating plane is $\theta_A$, and the angle (diffraction angle) of the arrangement direction of the output waveguide group 3B to the normal of the grating plane is $\theta_B$, the output waveguide groups 3A and 3B are arranged on one side of the input waveguide 2, so that a relationship of $\alpha > \theta_B > \theta_A$ is established. The relative arrangement of the output waveguide groups 3A and 3B is performed based on the operation theory similar to that in the first embodiment, such that the light of wavelength $\lambda_1$ is extracted by the output waveguide positioned on the center of the output waveguide group 3B, if the light of wavelength $\lambda_0$ is extracted by the output waveguide positioned on the center of the output waveguide group 3A.

On the grating plane of the concave diffraction grating 4', as shown in a Y enlarged diagram in (B) of FIG. 4, there is consecutively formed along the end face 1b' of the slab waveguide 1', a plurality of grating grooves each including a reflection plane 4A' blazed corresponding to the arrangement direction of the output waveguide group 3A and a reflection plane 4B' blazed corresponding to the arrangement direction of the output waveguide group 3B. Herein, blaze angles $\epsilon_A'$ and $\epsilon_B'$ of the reflection planes 4A' and 4B' have values different from each other. Further, an area ratio between the reflection planes 4A' and 4B' is adjusted, so that the powers of the diffracted lights reflected by the reflection planes 4A' and 4B' become substantially equal to each other.

Here, as a specific example of the optical multiplexer/demultiplexer as described above, there is cited a configuration for the case where the multiplexing/demultiplexing is performed on lights arranged at the wavelength spacing 0.4 nm in a wavelength band whose center is 1550 nm, similarly to the first embodiment.

In the configuration of the specific example, a material of the optical waveguide is a silica glass, the thickness of an under cladding layer is 20 μm, and the thickness of an over cladding layer is 20 μm. In each of the input and output waveguides, a cross section of a core is 5.4×5.4 μm, and a relative index difference is 0.80%. Further, the focal distance f determining the total length of the slab waveguide 1' is 34.3 mm, and the interval Δx between the output waveguides is 20 μm. In the concave diffraction grating 4', the grating interval d is 15 μm, and the blaze angles $\epsilon_A$ and $\epsilon_B$ are respectively 32.1° and 34.5°. The input waveguide 2 is arranged so that the incident angle α is 36.9°. In the arrangements of the output waveguide groups 3A and 3B, the output waveguide positioned on the center of the output waveguide group 3A is arranged in a direction of diffraction angle of −32°, while the output waveguide positioned on the center of the output waveguide group 3B is arranged on a position shifted by 10 μm to a direction of diffraction angle of −27.4° on the end face 1a' of the slab waveguide 1'.

According to such a specific configuration, the lights of wavelength spacing 0.8 nm, whose center is 1550 nm, are extracted from the output waveguide group 3A, and the lights of wavelength spacing 0.8 nm, whose center is 1550.4 nm, are extracted from the output waveguide groups 3B. As a result, the optical multiplexer/demultiplexer which multiplexes or demultiplexes the lights in 1550 nm band at the wavelength spacing 0.4 nm, can be realized.

As described above, according to the optical multiplexer/demultiplexer in the third embodiment, an effect similar to that in the first embodiment can be achieved, and additionally, since the focal distance f can be shortened, it becomes possible to realize the further miniaturized optical multiplexer/demultiplexer.

Next, there will be described a fourth embodiment of the present invention.

Figure 5:
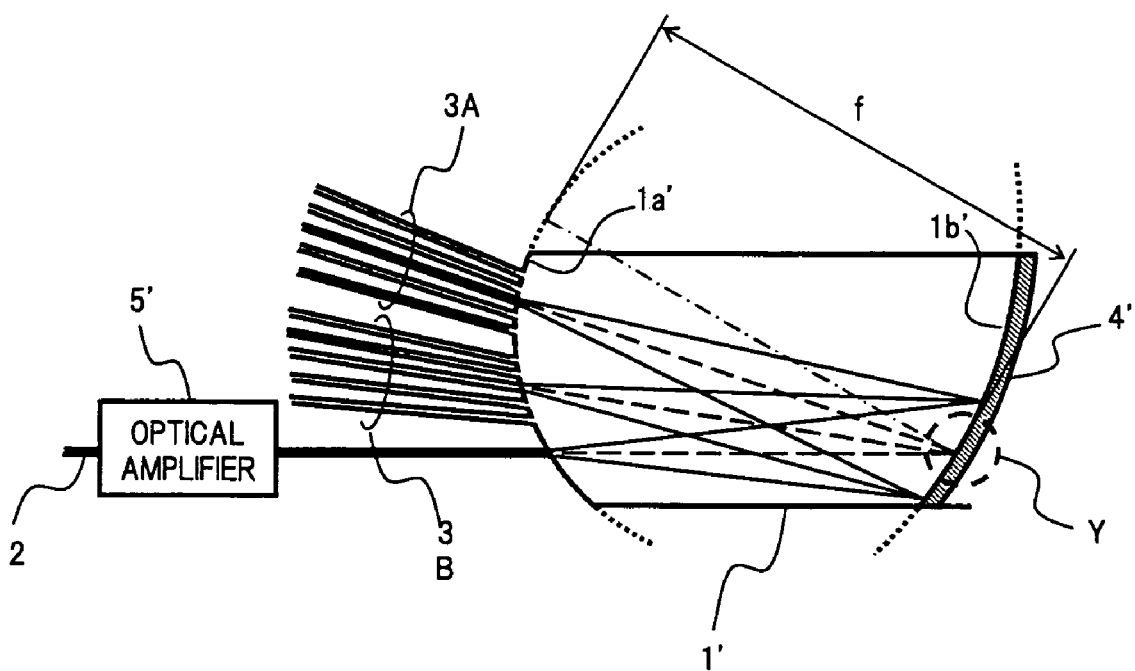
FIG. 5 is a top plan view showing a configuration of an optical multiplexer/demultiplexer according to a fourth embodiment of the present invention.

FIG. 5 is a top plan view showing a configuration of an optical multiplexer/demultiplexer according to the fourth embodiment.

In FIG. 5, the configuration of the present optical multiplexer/demultiplexer differs from that in the third embodiment, in that an optical amplifier 5' is connected to the halfway of the input waveguide 2. The configuration other than the above is same as the configuration in the third embodiment, and accordingly the description thereof is omitted here. The optical amplifier 5' is similar to the optical amplifier 5 used in the optical multiplexer/demultiplexer in the above second embodiment, and is a typical optical amplifier for amplifying the power of the incident light $L_1$ being propagated through the input waveguide 2 up to the required level.

In the optical multiplexer/demultiplexer of the above configuration, similarly to the second embodiment, an increase of loss caused by the division of the incident light $L_1$ into two by the concave diffraction grating 4', is compensated by the optical amplifier 5'. As a result, it becomes possible to realize an optical multiplexer/demultiplexer of small size at a lower cost.

Note, in the first to fourth embodiments described above, the number of output waveguides included in each output waveguide group is not limited to the specific example shown in each drawing. It is possible to configure each output waveguide group with the output waveguides of arbitrary numbers. Further, the configuration example in which two output waveguide groups are arranged has been shown. However, it is also possible to apply a configuration in which three or more output waveguide groups are connected to the slab waveguide to perform the multiplexing/demultiplexing on the lights of narrow wavelength spacing while suppressing an increase of focal distance. In this case, if N output waveguide groups are connected to the slab waveguide, it becomes possible to perform the multiplexing/demultiplexing on the lights whose wavelength spacing is narrowed to 1/N times, by using the concave diffraction grating including N reflection planes blazed respectively corresponding to arrangement directions of N output waveguide groups.

According to the present invention, in an optical multiplexer/demultiplexer using a diffraction grating, a plurality of output waveguide groups is arranged for a single input waveguide group, and a diffraction grating in which grating grooves each including a plurality of reflection planes blazed corresponding to arrangement directions of the output waveguide groups are formed, is used. Thus, since the wavelength spacing of lights to be multiplexed/demultiplexed can be narrowed while an increase of focal distance being suppressed, and a small size optical multiplexer/demultiplexer having excellent wavelength resolution can be realized, the large industrial applicability can be achieved.

What is claimed is:
1. An optical multiplexer/demultiplexer for multiplexing or demultiplexing lights of different wavelengths using a diffraction grating, comprising:
   a slab waveguide through which the lights are freely propagated along a waveguide plane of layer shape;

an input waveguide group consisting of one or more input waveguides connected to an end face of said slab waveguide;

a plurality of output waveguide groups each consisting of one or more output waveguides, which is positioned on the same side of said input waveguide group to be connected to the end face of said slab waveguide; and a diffraction grating in which a grating plane is arranged on an end face of said slab waveguide positioned on an opposite side of said input waveguide group, and grating grooves each including a plurality of reflection planes respectively blazed corresponding to arrangement directions of said plurality of output waveguide groups, are consecutively formed on said grating plane, wherein said respective output waveguide groups are arranged so that diffracted lights of wavelengths different from each other, which appear because the lights incident from said input waveguide group are propagated through said slab waveguide to be reflected by the respective reflection planes of said diffraction grating, respectively reach the output waveguides of said plurality of output waveguide groups.

2. An optical multiplexer/demultiplexer according to claim 1, wherein said plurality of output waveguide groups is arranged to the end face of said slab waveguide on both sides of said input waveguide group.

3. An optical multiplexer/demultiplexer according to claim 2, wherein the grating grooves each including the plurality of reflection planes symmetric to each other with respect to an arrangement direction of said input waveguide group are consecutively formed on the grating plane of said diffraction grating.

4. An optical multiplexer/demultiplexer according to claim 1, wherein said plurality of output waveguide groups is arranged to the end face of said slab waveguide on one side of said input waveguide group.

5. An optical multiplexer/demultiplexer according to claim 4, wherein an angle of the arrangement direction of each of said plurality of output waveguide groups to a normal of the grating plane of said diffraction grating becomes smaller than an incident angle of each of the light incident from said input waveguide group.

6. An optical multiplexer/demultiplexer according to claim 1, further comprising;

an optical amplifier amplifying the lights propagated through said input waveguide group.

7. An optical multiplexer/demultiplexer according to claim 6, wherein said optical amplifier is a semiconductor optical amplifier.

8. An optical multiplexer/demultiplexer according to claim 1, wherein an area ratio between said plurality of reflection planes of said diffraction grating is set so that the powers of the diffracted lights respectively reaching said plurality of output waveguide groups become substantially equal to each other.

9. An optical multiplexer/demultiplexer for multiplexing or demultiplexing lights of different wavelengths using a diffraction grating, comprising:

a slab waveguide through which the lights are freely propagated along a waveguide plane of layer shape;

a diffraction grating having a plurality of blazed planes in a grating groove, said diffraction grating formed on an end face of said slab waveguide;

an input waveguide group positioned on an opposite side of said diffraction grating, said input waveguide group consisting of one or more input waveguides connected to an end face of said slab waveguide; and a plurality of output waveguide groups positioned on an opposite side of said diffraction grating, said output waveguide groups each consisting of one or more output waveguides connected to an end face of said slab waveguide, wherein said respective output waveguide groups are arranged so that light beams are refracted at different angles depend on both a wavelength of input light incident from said input waveguide and a blazed angle of said blazed planes in the grating groove, respectively reach the output waveguides of said plurality of output waveguide groups.

10. An optical multiplexer/demultiplexer for multiplexing or demultiplexing lights of different wavelengths, comprising:

a slab waveguide through which the lights are freely propagated;

an input waveguide group comprising one or more input waveguides connected to an end face of said slab waveguide;

a plurality of output waveguide groups, each comprising one or more output waveguides positioned on the same side of said input waveguide group to be connected to the end face of said slab waveguide; and a diffraction grating including a grating plane having grating grooves consecutively formed thereon, each of said grating grooves including a plurality of reflection planes respectively blazed corresponding to arrangement directions of said plurality of output waveguide groups.

11. An optical multiplexer/demultiplexer according to claim 10, wherein an area ratio between said plurality of reflection planes of said diffraction grating is set so that the powers of the diffracted lights respectively reaching said plurality of an output waveguide groups become substantially equal to each other.

12. An optical multiplexer/demultiplexer for multiplexing or demultiplexing lights of different wavelengths, comprising:

a slab waveguide through which the lights are freely propagated;

a diffraction grating having a plurality of blazed planes in a grating groove, said diffraction grating formed on an end face of said slab waveguide;

an input waveguide group positioned on an opposite side of said diffraction grating, said input waveguide group comprising at least one input waveguide connected to an end face of said slab waveguide; and a plurality of output waveguide groups positioned on an opposite side of said diffraction grating, wherein said respective output waveguide groups are arranged so that light beams are refracted at different angles based on a wavelength of input light incident from the corresponding input waveguide and a blazed angle of the blazed planes in the grating groove, so that the light beams at different angles respectively reach the output waveguides of said plurality of output waveguide groups.

* * * * *